United States Patent [19]

Russell, Jr.

[11] 3,888,381
[45] June 10, 1975

[54] PROTECTIVE DEVICE FOR PREVENTING WITHDRAWAL OF LIQUID FROM A TANK

[76] Inventor: Wayne B. Russell, Jr., 3895 Lugo Ave., Lynwood, Calif. 90262

[22] Filed: May 17, 1974

[21] Appl. No.: 470,737

[52] U.S. Cl. .................... 220/86 AT; 85/71; 85/86
[51] Int. Cl. ............................................. B65d 25/02
[58] Field of Search ..... 220/86 AT, 86 R, 235, 233; 85/61, 62, 67, 70, 71, 66, 86, 87, 88, 75, 76; 138/89

[56] References Cited
UNITED STATES PATENTS

| | | | |
|---|---|---|---|
| 2,218,581 | 10/1940 | Levan | 138/89 |
| 2,923,323 | 2/1960 | Franck | 220/235 |
| 3,002,649 | 10/1961 | Turley | 220/86 AT |
| 3,143,915 | 8/1964 | Tendler | 85/71 |
| 3,160,188 | 12/1964 | Frank | 85/61 |
| 3,550,636 | 12/1970 | Hearne | 220/235 |

Primary Examiner—William I. Price
Assistant Examiner—Allan N. Shoap
Attorney, Agent, or Firm—Donald D. Mon

[57] ABSTRACT

There is disclosed a device for blocking the fill pipe of a liquid receptacle such as the fuel tank of an automobile against insertion of a tube which could withdraw the liquid. The device comprises two spiders each having a central plate, the two plates being spaced one above the other, each plate having a plurality of flexible legs spaced at angular positions around the respective plates, the legs of the upper plate extending outwardly and downwardly, and the legs of the lower plate extending outwardly and upwardly. The legs of the spiders are arranged in pairs, the two legs of each pair crossing each other. Each pair comprises one leg of each spider. Where the legs of the pairs cross they are interlocked by one of the legs passing through a slot of the other, the unslotted leg having a shoulder which bears against the other leg at the slot. A screw passes through the two plates in such a manner that turning of the screw draws the plates together, expanding the legs against the interior wall of the fill pipe. By severing the screw at a position above the upper plate, the device cannot be removed except by special tooling.

8 Claims, 7 Drawing Figures

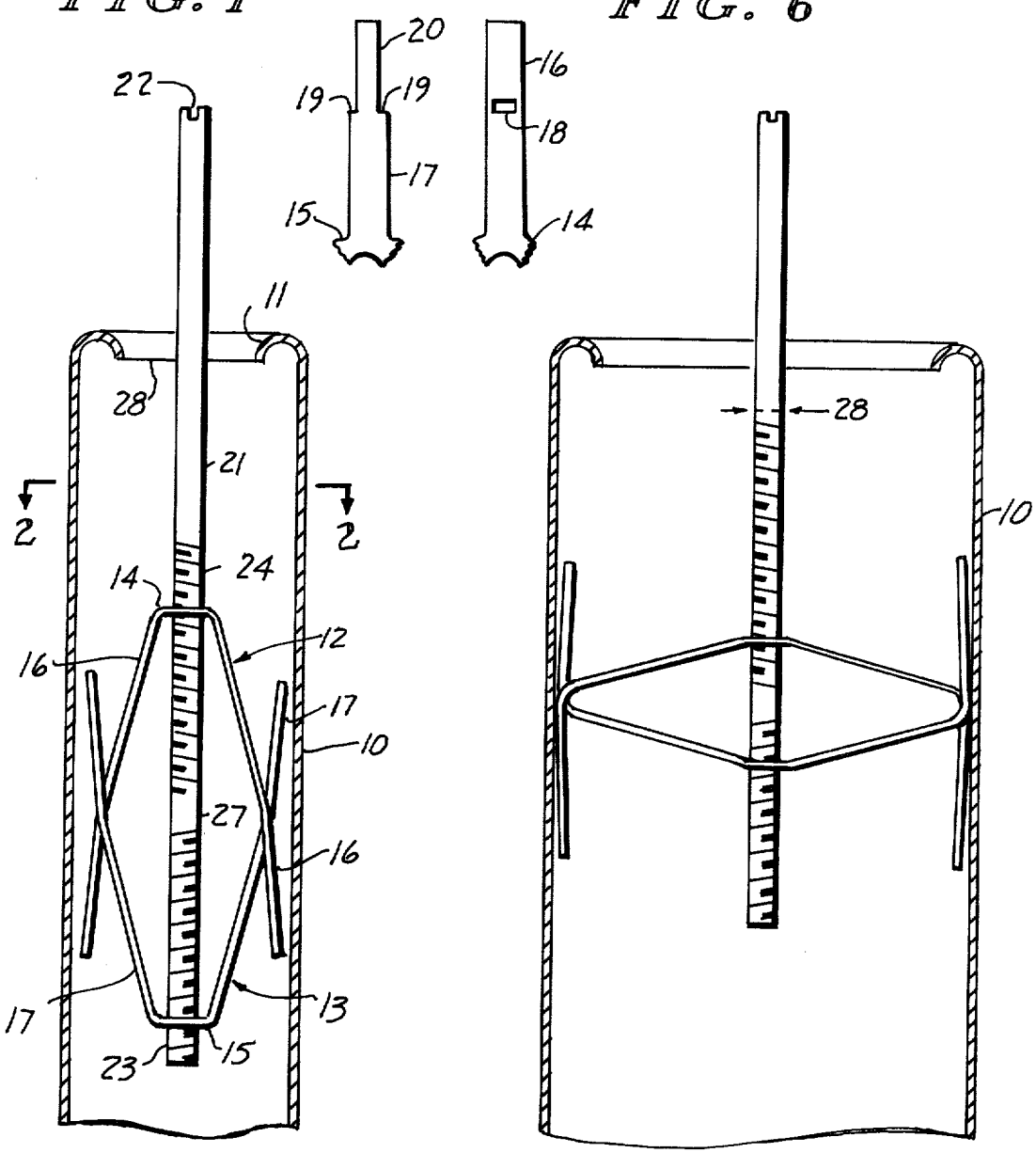
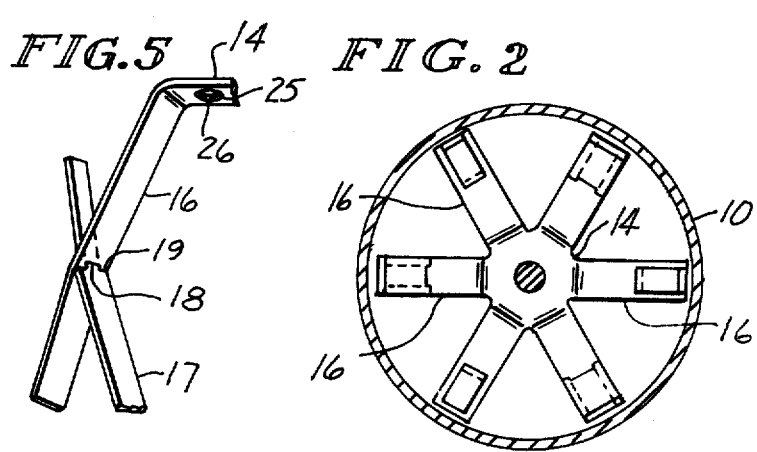

PROTECTIVE DEVICE FOR PREVENTING WITHDRAWAL OF LIQUID FROM A TANK

This invention relates to protective devices for preventing the withdrawal of liquid from a receptacle provided with a filler pipe, for example automobile fuel tanks. Many liquid receptacles such as automobile fuel tanks are installed with a filler pipe protruding upward from the tank so that when a cap is removed from the top of the filler pipe the nozzle of the fuel pumping mechanism can be inserted into the pipe to add liquid fuel, typically gasoline. There are sometimes thieveries of the liquid such as gasoline from such tanks, commonly performed by inserting one end of a tube into the tank through the filler pipe and the other end of the tube into another container so that by the application of suction on the tubing a syphon effect is created which withdraws the liquid from the receptacle or tank and can continue until the tank is depleted.

A number of expedients have heretofore been used and proposed for preventing or impeding such thieveries, including locking devices and the like. Locking devices have the disadvantages of having to be unlocked and requiring a key to unlock them.

An object of the present invention is to provide a protective means requiring no unlocking operation nor any key or the like, which can be installed in the fill pipe so that it will block the introduction of tubing which could be used to syphon or pump out the liquid contents.

A related object is to provide such a protective means which can not be removed from the fill pipe by any ordinary means, and will require special tooling to remove it.

The invention is carried out by provision of a pair of spiders each having a central plate and a number of flexible spider legs extending outward from the plate. The legs of the two plates are arranged in pairs and one of each pair has a slot which engages the leg of the other member of the pair. Each spider leg is substantially longer than the distance from its central plate to the internal surface of the fill pipe and the legs extend outwardly and downwardly from their respective plates. At least one of the central plates has a hole through it adapted to thread to a screw which is passed through it and rotatably secured to the other central plate, so that turning of the screw moves the plates together and extends the spider legs laterally to meet and bear against the internal surface of the fill pipe to set the protective device in its protecting position. After being set, the shank of the screw is severed at a position above the upper spider plate, thereby removing the screw head so that the screw cannot be turned without a special tool.

An optional feature resides in the use of threads of opposite hand for the screw with a hole through both plates adapted to thread to the respective threads of opposite hand.

The foregoing and other features will be better understood from the following detailed description and the accompanying drawing of which:

FIG. 1 is a longitudinal view in cross-section showing a protective device according to this invention as it is being installed in the upper part of a fill pipe for a liquid receptacle, prior to setting it in place;

FIG. 2 is a cross-section view taken at line 2—2 of FIG. 1;

FIG. 3 shows a spider leg provided with a slot, used in FIG. 1;

FIG. 4 shows a spider leg without a slot, used in FIG. 1;

FIG. 5 shows a detail of the interconnection of a pair of spider legs those of FIGS. 3 and 4;

FIG. 6 is a cross-section view on a larger scale than in FIG. 1 showing the device of FIG. 1 after it has been set but before severing the screw shank; and FIG. 7 shows a partial view of a modified form of protective device according to this invention.

Referring to FIGS. 1 to 5 there is shown the upper part of a fill pipe 10 of a receptacle or tank for liquid which will be below the fill pipe. In filling the tank with gasoline or other fuel or liquid the nozzle through which the fuel is pumped is inserted in the upper opening 11 after removing a cap (not shown) normally set at the top of the fill pipe.

In accordance with this invention the protective device comprises two spiders 12 and 13 each provided with a central plate 14 and 15. From central plate 14 there extend a plurality of spider legs 16 and from plate 15 there extend another plurality of spider legs 17. Legs 16 extend radially outward and downward and legs 17 extend radially outward and upward and for each leg 16 there is a corresponding leg 17 such that the pair of corresponding legs cross each other. To provide for this cross-over each leg 17 is provided with a hole 18.

To provide for this cross-over, one leg of each pair is provided with a slot 18, as best seen in FIG. 3, and the other leg of each pair is provided with a pair of shoulders 19 formed by abruptly narrowing the width of the strip at these shoulders at the extremities 20, narrow enough to pass through the slot 18 of the other leg of the pair, as best seen in FIGS. 4 and 5. Although it is possible that a slot 18 shall appear in each leg 16 of the lower spider 13 it is preferable that alternate legs 16 of spider 12 shall have the slots and that the other alternate legs shall have the narrowed end strips forming the shoulders. Likewise the spider 13 will then have its alternate legs with the slots and the remaining alternate legs with the shoulders. In assembling the two spiders with each other they will be angularly positioned so that each narrowed strip of the lower spider legs shall pass through a slot of a corresponding leg of the upper spider and likewise each narrowed strip of the upper spider shall pass through a slot in the leg of the lower spider. FIG. 5 illustrates the interlocking arrangement of an upper spider leg 16 with a lower spider leg 17. The next angularly positioned pair of legs will be interlocked similarly to the arrangement shown in FIG. 5 except that in that case it will be the leg 16 of the upper spider that will have the shoulders and the corresponding leg 17 will have the slot.

The upper and lower spider legs are all interlocked with each other in pairs as just described and the spiders are mounted on a screw 21 provided with a recessed screw slot 22 at its upper end, a set of threads 23 at the end opposite the screw head, and above the threads 23 another set of threads 24 of opposite hand to threads 23. Each plate 14 and 15 is provided with a central hole which is threaded to the screw. In FIG. 5 there is shown the hole 25 of the upper plate 14 provided with internal threads 26. To assemble the spiders to the screw shank the two spiders are assembled with their pairs of legs inter-meshed as shown in FIGS. 1, 2 and 5. This can be done by inserting the top of the screw up through the hole through the plate 14 until the plate 14 meets the upper threads 24, whereupon a rotation of the spider 12 in the proper direction will cause this spider to ride down on these threads 24. At the same time the lower spider 13 can be threaded onto the lower end of threads 23 and by turning it in the same direction of rotation as that of spider 12, the lower spider 13 will ride upward on threads 23. Since the two spiders rotate in unison in the same direction their pairs of legs can be caused to interlock as shown in FIG. 5 and take the position illustrated in FIG. 1 in which the shoulders 19 engage the strips 16. Any further turning of the spiders relative to the screw beyond that producing the position shown in FIG. 1, would, of course, start to expand the spiders toward the position shown in FIG. 6.

As assembled to the position shown in FIG. 1, the spider legs of the two spiders do not meet the inner wall of the particular form of fill pipe illustrated. The reason for this is the presence of the turned-in lip 28 at the mouth of this form of fill pipe which reduces the effective diameter at this mouth, and the assembled spiders must be sufficiently constricted to pass into and through the mouth. If there were no such turned-in lip the spider assembly could be made wide enough so that the legs could touch the fill pipe wall during its introduction into the fill pipe.

To install the device it will be inserted into the fill pipe to a depth which still permits access to the screw head 22. The screw will then be turned by a screw driver in the direction which will cause the two plates 14 and 15 to move toward each other, and to permit this action it will usually be desirable to insert a long rod or screw driver down into the pipe along side one of the pairs of spiders to prevent them from turning while the screw is turning, at least until the spider legs are moved into contact with the fill pipe wall. This will occur after some turning of the screw because the action of the shouldered legs against the slotted legs while the plates 14 and 15 are moving together will be to cause the portions of the legs extending from the respective plates to become more horizontal until the lower leg portions are in full contact with the pipe wall. As the turning of the screw continues, the ends of the spider legs will align themselves longitudinally along the pipe wall, the leg ends of the upper legs extending downward and the leg ends of the lower legs extending upward as shown in FIG. 6. By sufficient turning of the screw the pressure of the leg ends against the pipe wall by the pushing of the leg portions near the plates will hold the leg ends firmly against the wall so that the spiders cannot be dislodged. When this set position is reached the screw will be severed at a position 28 which may be done by suitable cutters.

The number of legs of the spiders can be made sufficient so that there is insufficient space between adjacent pairs of legs to insert a tube which could be used to empty the tank.

An alternative form of device is illustrated in FIG. 7 which shows a pair of spiders similar to those of FIG. 1, mounted on a screw 29 of which only the lower portion is shown. In this case there is only one set of screws threads 30 so that only the upper plate 14 need be threaded to the screw. The hole through the lower plate 15 need not be threaded hence there are no threads where it is positioned. This lower plate is held in place on the screw by means of a rivet head 31.

It will be understood that the embodiments of the invention illustrated and described herein are given by way of illustration and not of limitation, and that modifications or equivalents or alternatives within the scope of the invention may suggest themselves to those skilled in the art:

I claim:

1. A protective device for blocking a fill pipe of a liquid receptacle against insertion of an object comprising:
   two spiders each having a central plate, the plates of the two spiders being arranged one above the other and spaced from each other;
   a plurality of flexible legs extending outward from each plate and toward the other plate, the legs of the two plates being angularly spaced around the respective plate and being arranged in pairs;
   interlocking means at the legs of each pair causing one leg of each pair to cross the other leg of the pair to interlock with said other leg of the pair at a position intermediate between the plates and the ends of the legs of the pair;
   the upper one of the plates having a threaded hole through it and the lower one of the plates having a screw engaging means;
   a threaded screw passing threadedly through the threaded hole of the upper plate and engaging the screw engaging means of the lower plate, said screw having a torquing means at its end above the upper plate;
   the end section of each leg beyond the position of crossing the leg of the other of the pair being bendable at the position of crossing;
   whereby turning the screw draws the plates toward each other, causing the inner sections of the spider legs located between the respective plates and the crossing positions to move more nearly parallel to each other so that said crossing positions meet the wall of the pipe, and the end sections extend longitudinally along the pipe wall, thereby setting the protective device.

2. A device according to claim 1 in which the end of the screw having the torquing means is severed from the remainder of the screw.

3. A device according to claim 1 in which the interlocking means comprises a slot through one leg of each pair and a shoulder means on the other leg of each pair so that the shouldered leg passes through the slot and the shoulder means engages the surface of the slotted leg.

4. A device according to claim 3 in which the slotted legs of each spider are angularly alternate legs and the shouldered legs of each spider are the remaining angularly alternate legs.

5. A device according to claim 3 in which the width of the shouldered legs at the end sections is less than that of the slotted legs of a pair so that the end section can pass through the slot.

6. A device according to claim 1 in which the end sections of the legs of the lower spider extend upwardly from the crossing position and the end sections of the legs of the upper spider extend downwardly from the crossing positions.

7. A device according to claim 1 in which the screw has an upper set of threads of one hand and a lower set of threads of the opposite hand and the engaging means of the lower plate comprises a hole having threads of the opposite hand to that of the hole in the upper plate, the upper plate hole being threaded to the upper threads and the lower plate hole being threaded to the lower threads.

8. A device according to claim 1 in which the lower plate attaching means comprises a hole through the lower plate and a rivet head at the lower end of the screw adapted to engage the under side of the lower plate.

* * * * *